Nov. 23, 1965  A. L. BURNETT  3,218,814
AUTOMATIC BLOCK POSITIONER
Filed Aug. 6, 1962  3 Sheets-Sheet 1

INVENTOR
A. L. BURNETT
BY
AGENT

Nov. 23, 1965  A. L. BURNETT  3,218,814
AUTOMATIC BLOCK POSITIONER
Filed Aug. 6, 1962  3 Sheets-Sheet 2
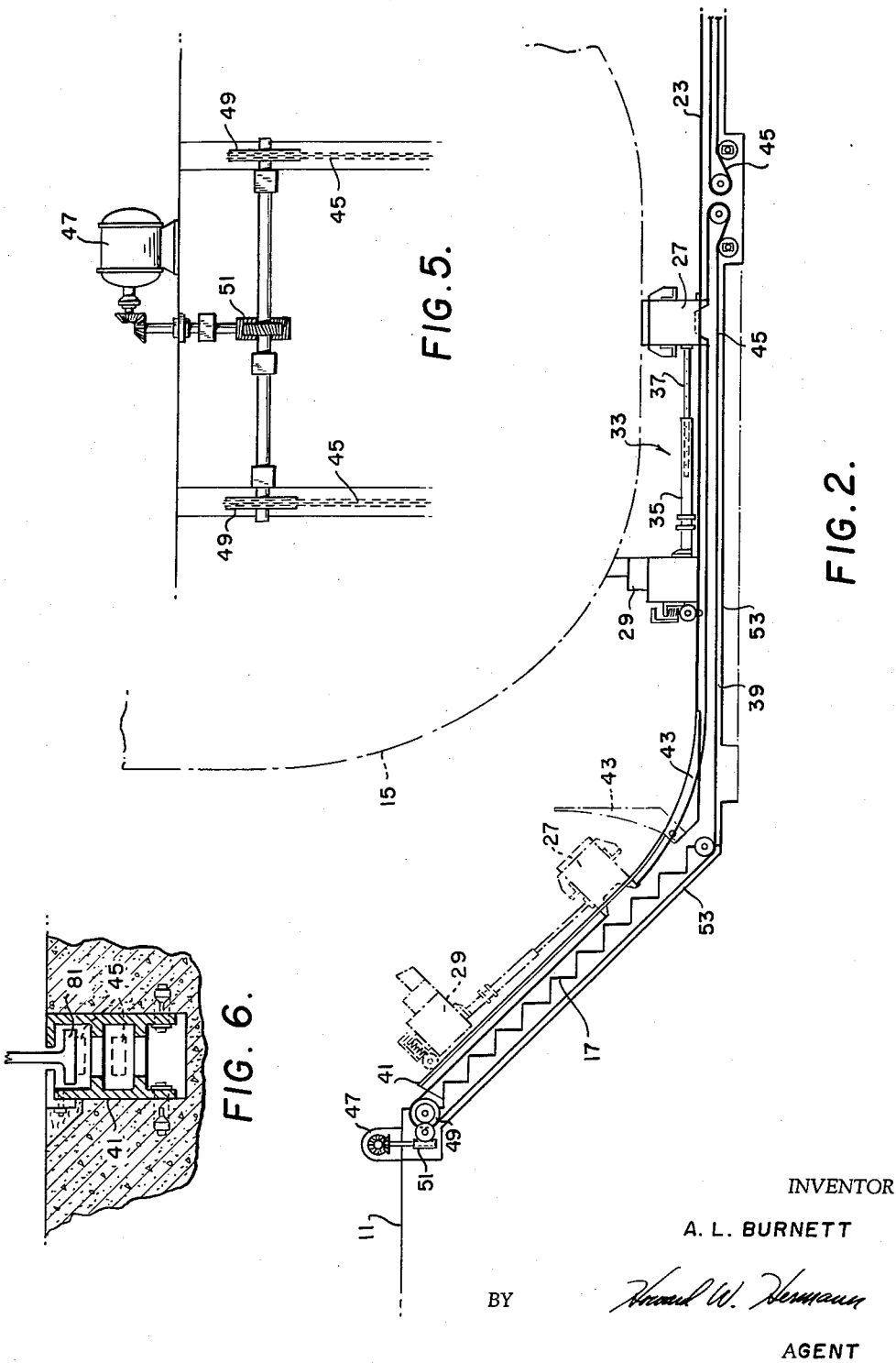
INVENTOR
A. L. BURNETT
BY
AGENT Nov. 23, 1965   A. L. BURNETT   3,218,814
AUTOMATIC BLOCK POSITIONER
Filed Aug. 6, 1962   3 Sheets-Sheet 3
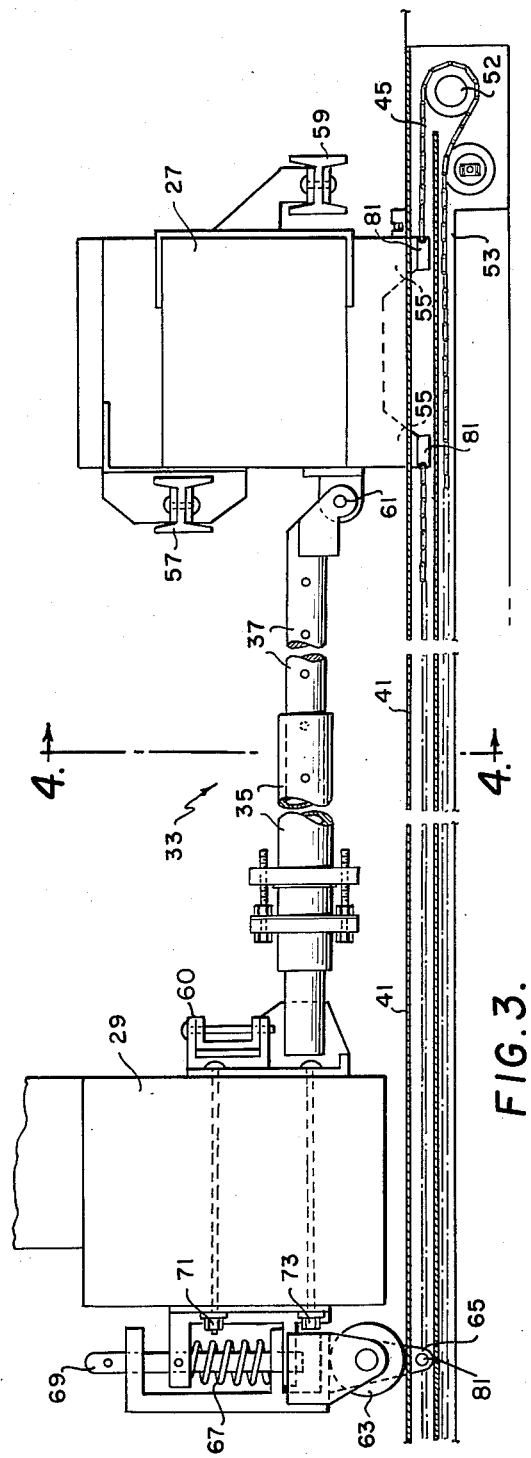
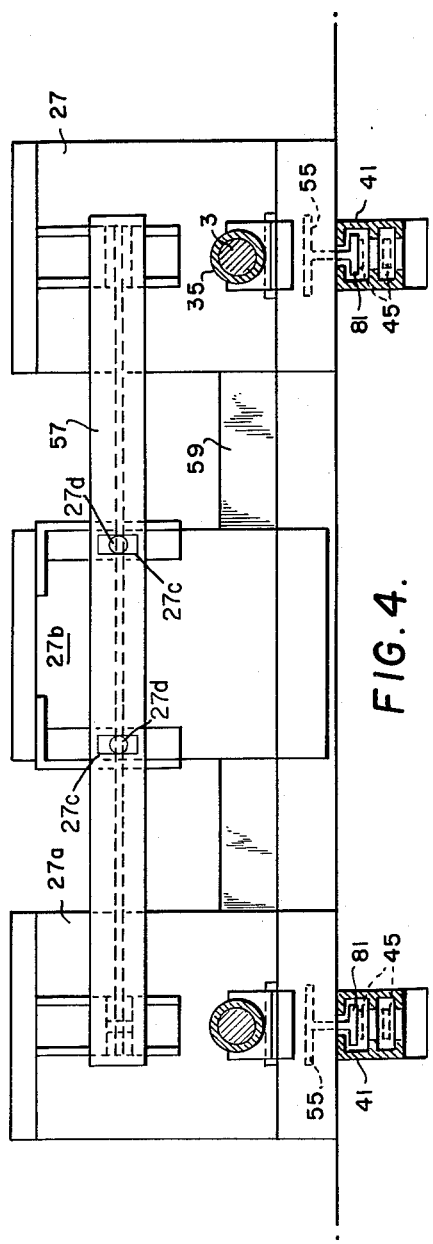
INVENTOR
A. L. BURNETT
BY Howard W. Hermann
AGENT

United States Patent Office 3,218,814
Patented Nov. 23, 1965

3,218,814
AUTOMATIC BLOCK POSITIONER
Arden Louis Burnett, 619 Nicholson St., Falls Church, Va.
Filed Aug. 6, 1962, Ser. No. 215,253
10 Claims. (Cl. 61—66)

The invention described herein may be manufactured and used by or for the Government of the United States of America for governmental purposes without the payment of any royalties thereon or therefor.

The present invention relates to ship dry docks and more particularly to a system for the positioning and removing of keel and bilge blocks while underwater in the basins of dry docks.

The shipbuilding industry today is faced with the problem of dry-docking ships which have drafts exceeding the operating depths of many existing dry docks. The draft of typical modern ocean-going cargo ships has increased an average of four feet in the past 20 years while many Naval ships, in addition to deeper draft are further being equipped with large sonar domes projecting, in some cases, seven to ten feet below the keel line and large propellers projecting below the ship which materially increase their drafts still further. Existing dry-docking facilities in many cases therefore require stripping ships to their lightest possible drafts to permit dry-docking, and a number of installations of a dry dock lock system, which is described in copending application Serial Number 20,504, filed 6 April 1960, now U.S. Patent 3,133,420, have been made in order to increase the capacity of existing dry-docking facilities. Although new and deeper dry dock facilities could be constructed, the cost of such installations is prohibitive if existing facilities can be equipped at an economical cost to accommodate large ships.

While a ship is in a dry dock for building or repair, keel and bilge blocks must be provided to support the ship's hull when the dock basin is dewatered. It has in the past been common practice to provide fixed or self standing or cribbed blocking on the dry dock floor, the blocking being positioned on the dock floor while the basin is dry, before the ship is moved into the dock. Even when the aforementioned dry dock lock system is used, if the dock basin is sufficiently wide the blocking may be pre-positioned on the dock floor at one side of the dock and the ship brought into the dock alongside the blocking.

When a deep draft ship is to be placed in a dry dock not equipped with a lock or even in a narrow dry dock which is equipped with the lock, difficulty is encountered since the ship's bottom or sonar dome may fail to clear the docking blocks. It has heretofore been limited practice in certain docks to provide movable bilge blocks which slide on raised floor runners across the dock floor. The provision of numerous raised bilge block runners across the dock floor, however, presents an impossible arrangement for efficient ship repairs using automotive equipment operating on the dock floor.

There is provided, in accordance with the present invention, a mechanical system for setting and removing all keel and bilge blocks under water on the floor of a dry dock while the basin is flooded. The blocks thereby may be set, adjusted, and properly spaced on the mechanical system while the dry dock basin is dry before the dock is flooded for ingress of ships. The blocking assembly is then moved out of the docking area until the ship is in position in the flooded dock and then the blocking assembly is moved into position under the ship's hull. Water is then drained or pumped out of the dock until the dry dock is empty. No raised guides which would impede the use of automotive equipment in ship repairs are necessary, and the removal of the blocks from the area where the ship is to be docked allows deep draft ships to be warped into the dock without the danger of striking the blocks. The system may be used, for example, with a dry dock lock such as that described in the aforementioned U.S. Patent 3,133,420, but is not limited to such use.

Accordingly, an object of the present invention is the provision of a system for positioning and removing keel and bilge blocks under water.

Another object is to provide sufficient clearance over dry dock floors to permit the docking of ships of deeper draft than the dry dock was originally designed to accommodate.

A further object is the provision of a system for rapid underwater keel block placement and removal in dry docks which are provided with slidable bilge blocks.

A still further object is the provision of means for removal and positioning the ship docking blocks under those ships with projections such as sonar domes and the like.

Other objects and many of the attendant advantages of this invention will be readily appreciated as the same becomes better understood by reference to the following detailed description when considered in connection with the accompanying drawings in which like reference numerals designate like or corresponding parts throughout the figures thereof and wherein:

FIG. 2 is a side view in elevation of the block positioner shown in FIG. 1.

FIG. 3 is a detail side view, partly in cross-section, of a portion of the block positioner shown in FIGS. 1 and 2.

FIG. 4 is a sectional view of the block positioner of FIGS. 1–3 taken on the line 4—4 of FIG. 3 and looking in the direction of the arrows.

FIG. 5 is a partly schematic view of the drive system for the block positioner shown in FIGS. 1–4.

FIG. 6 is a cross-sectional view in greater detail of the block rails shown in FIGS. 2 through 4.

Figure 1:
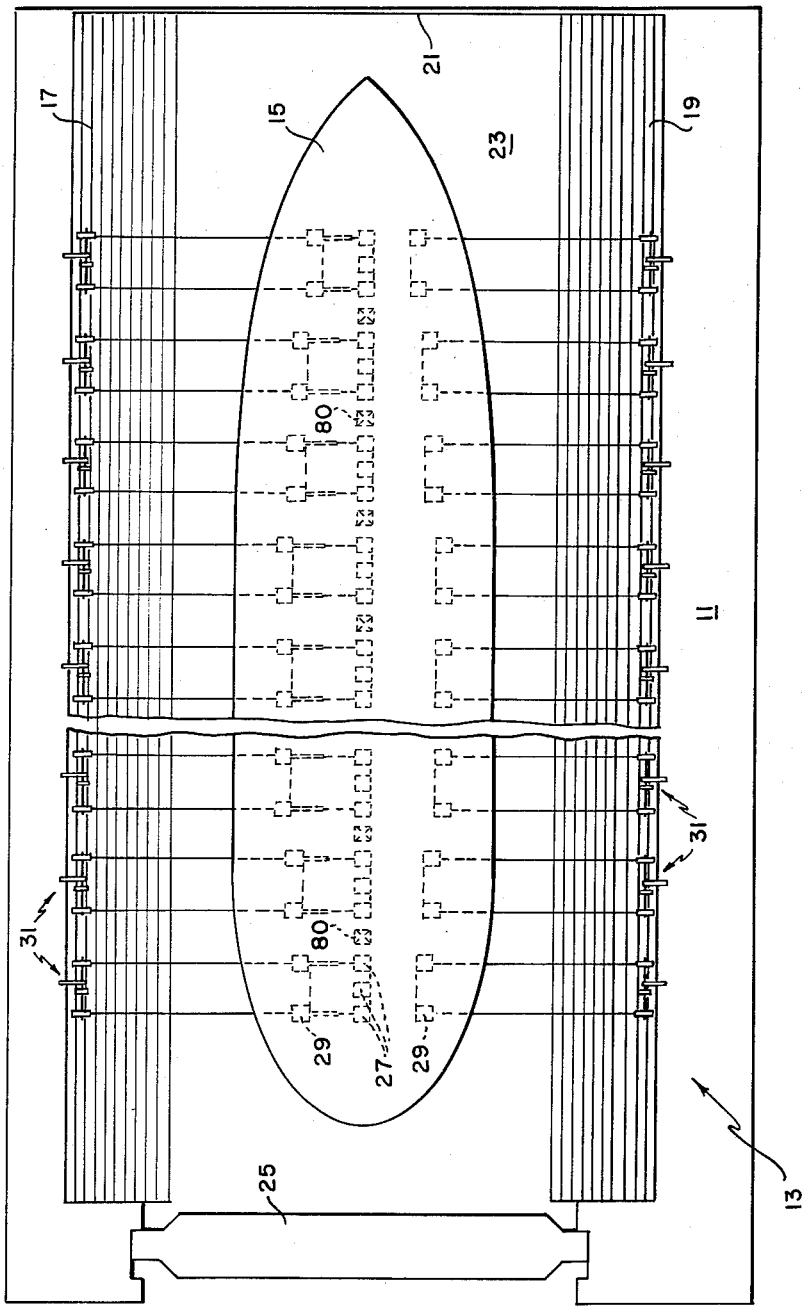
FIG. 1 is a top view of a graving dock basin area having a ship dry-docked therein and utilizing an embodiment of the block positioner of the present invention.

Referring now to the drawings, wherein like reference characters designate like or corresponding parts throughout the several views, there is shown in FIG. 1 a graving dock 11 having a basin 13 with a ship 15 docked therein. The dock basin 13 is defined by a pair of side walls 17, 19, an end wall 21, a floor 23, and a removable caisson or gate 25 for allowing ship ingress and egress to and from the basin.

The ship 15 is supported above the floor 23 of the basin by a plurality of central support elements, i.e. keel blocks 27 and a plurality of outer support elements, i.e. bilge blocks 29. The keel blocks 27 and the bilge blocks 29 are positioned beneath the ship in supporting relation thereto by means of a plurality of block positioning systems (shown generically by arrows 31).

An odd block 80 may be positioned under the ship's hull with a fork lift truck after the ship is in the dry or may be positioned on a single flush rail spanning across basin and onto one side wall. Block 80 is removed before undocking by removing wedges between the block and hull, or if a single rail is installed, the block is hauled up the side wall of the dock basin.

Referring now to FIG. 2, there is illustrated a side view of the dry dock basin in which an embodiment of a block positioning system is shown in greater detail. As shown in the embodiment the bilge blocks 29 and the keel blocks 27 are interconnected to form a crib by an adjustable rigid interconnecting means 33 which may comprise for example a pair of telescoping pipes 35 and 37 which may be adjusted to obtain any desired spacing.

Mounted in a pair of compartments 39 in the walls 17 and the floor 23 of the dock basin 13 are a pair of rails 41. Each of the rails 41 has a movably mounted, pivoted curved section 43 interconnecting the wall portion of the rail with the floor portion of the rail. In at least the floor portion of the rail the top of the rail 41 is flush with the dock floor. Thus by swinging the pivotal portion 43 upward into the position shown by the broken line in FIG. 2, wheeled equipment is able to be operated around the ship without being obstructed by rails protruding above the level of the dry dock. If the dry dock is sufficiently wide the added expense of the swinging curved section 43 may be omitted and made stationary.

The bilge blocks 29 and keel blocks 27 are designed for movement along rails 41, as will be described in greater detail hereinafter. In accordance with the present invention, the interconnected blocks 29 are moved along the rails 41 by means of a pair of chains or the like 45 which may be driven, for example, by power means such as an electric motor 47 interconnected with a pair of pulleys 49 by a gear system 51 (see FIG. 5). The chains 45 run around a system of pulleys 52 in a slotted compartment 53 provided in the dry dock basin walls 17 and floor 23.

As may be seen more easily from FIGS. 3 and 4, the drive chains 45 are attached to fins 55 affixed to the bottom of the keel blocks 27. The block rails 41 are flush with the dry dock floor and are formed in two vertically juxtaposed compartments to prevent the two lengths of chain from becoming entangled. The tops of the rails are flat and contain a continuous slot to allow the block fins 55 to pass downwardly toward the bottom of the top compartment so that it may be connected to the driving chains 45. The bottom portion of the fin 55 has an inverted T shaped plate or hold-down bar 81 to prevent tipping of keel or bilge blocks (FIG. 6). Elongated slots at predetermined spacings are also provided at intervals in the bottom of each compartment so that sand from sandblasting operations in scraping the hull of a ship may fall through the continuous rail slot and through both compartments to a drainage ditch below and be washed away into the conventional dry dock drainage ditches.

A pair of keel blocks 27, 27a are normally rigidly connected together so that they may be hauled by a pair of chains driven by a single power source. As may be seen from FIG. 4, a third keel block may be carried by a pair of substantially rigid support members 57, 59. The third block 27b is carried slightly spaced from the dock floor, but the elasticity of the supports 57, 59 allow the block to rest on the floor when the weight of a ship is placed on the blocks, or elongated slots 27c located in the stringers 57 and 59 in cooperation with pins 27d carried by the block 27b may be provided to allow block 27b to float slightly above the floor when submerged. A support member 60 may be provided to interconnect the bilge blocks in essentially the same manner as members 57, 59 interconnect the keel blocks.

The adjustable connecting linkage 33 between the keel blocks 27 and the bilge blocks 29 is pivotally connected to the keel block by means of a pivot pin 61 which allows the interconnection to pivot as the blocks are moved between the side walls and floor of the dry dock basin. The bilge blocks 29 are mounted on rollers 63 which roll on the rails 41 and have in addition a guide fin 65 which also projects into the upper compartment of the rail 41 and provides proper alignment of the block. The block is prevented from tipping action by the hold-down bar 81.

Each of the bilge blocks is held clear of the dry dock floor while the block is being moved by means of a coil spring 67 biased against rollers 63. A pin 69 is provided through the center of the spring 67 in order to keep it in its proper supporting position. The coil spring supporting arrangement is bolted to the bilge block 29 by means such as bolts 71, 73 which may pass completely through the blocks to also secure the block interconnecting linkage 33 to the bilge block. The spring is chosen so that the force exerted by it is sufficient to keep the block above the dock floor but when the weight of a ship is placed on the block, the spring compresses and the block settles to the floor.

It will be realized that a number of modifications of the present invention are possible without departing from the spirit of the present invention. For example, the keel blocks could be provided with spring supports similar to those of the bilge blocks. Extra blocks could be carried by any given pair of rails by simply interconnecting them with the blocks shown and described herein by way of example.

The invention as described above, provides a workable, relatively inexpensive, and efficient system for the exact positioning and removal of keel and bilge blocks in a dry dock while the blocks are under water. Thus, it allows the dry-docking of ships which would not be able to clear the tops of prepositioned or stationary blocks. The system allows operation of any and all equipment for routine work in a dry dock without interference due to raised rails or the like. Other advantages of the system will also be realized by those skilled in the art.

Obviously many other modifications and variations are possible in the light of the above teachings. It is, therefore, to be understood that within the scope of the appended claims, the invention may be practiced otherwise than as specifically described.

What is claimed is:
1. Apparatus for positioning supports on a surface beneath an object at desired support points to support the object against gravity, comprising:
    a plurality of inner and outer support means;
    adjustable means connecting selected ones of said inner support means to selected ones of said outer support means at fixed spaced intervals to define desired points of support for the object;
    guide means located in the said surface for engaging an underside portion of said inner and outer support means;
    and drive means coupled to said support means for moving said support means in conformity with said guide means to and from positions corresponding to desired points of support of the object.
2. Apparatus according to claim 1 wherein said surface has an opening and wherein said drive means is located beneath said surface and has means engaging said support means via said opening.
3. Apparatus according to claim 1 wherein the surface comprises a floor and wall means having a junction with said floor.
4. Apparatus according to claim 1 wherein each of said inner and outer support means comprises a plurality of interconnected discrete support elements.
5. Apparatus according to claim 4 wherein at least some of said support elements have an underside portion arranged for engagement with said guide means.
6. In a dry dock, apparatus for positioning supports on the inner surface of the dry dock at desired support points beneath a vessel, comprising:
    a plurality of inner and outer support means arranged in pairs, each of said support means being composed of a plurality of discrete blocks;
    means interconnecting the discrete blocks of said inner support means to each other and means interconnecting the discrete blocks of said outer support means to each other;
    adjustable means connecting selected ones of said inner support means to selected ones of said outer support means at intervals therebetween to define desired points of support;

guide means for each interconnected pair of support means located in the inner surface of the dry dock for engaging an underside portion of at least one of the discrete blocks in each said pair of support means;

and drive means coupled to at least one of the discrete blocks for moving each pair of support means to the desired support points.

7. Apparatus according to claim 6 wherein at least one of the discrete blocks is buoyant in water.

8. Apparatus according to claim 6 wherein said guide means comprises recess means in the dry dock inner surface and means extending thru said recess means coupling at least one block to said drive means.

9. Apparatus according to claim 8 wherein said means extending thru said recess means comprises an extension of said block, and wherein said guide means further comprises track means located in said recess means for co-acting with said block via said extension, and a hold down bar positioned under said guide means to prevent tipping of the block.

10. Apparatus according to claim 9 wherein said track means comprises a pivotable section located approximately at the junction of the floor and walls of the dry dock.

References Cited by the Examiner

UNITED STATES PATENTS

| | | | |
|---|---|---|---|
| 341,582 | 5/1886 | Lang | 61—66 |
| 3,073,125 | 1/1963 | Pearlson | 61—66 |
| 3,123,979 | 3/1964 | Scrutton | 61—66 |

FOREIGN PATENTS

| | | |
|---|---|---|
| 395,102 | 7/1933 | Great Britain. |
| 843,953 | 1/1957 | Great Britain. |

CHARLES E. O'CONNELL, *Primary Examiner.*

JACOB SHAPIRO, EARL J. WITMER, *Examiners.*